United States Patent
Chatellier et al.

(10) Patent No.: US 6,309,548 B1
(45) Date of Patent: Oct. 30, 2001

(54) METHOD FOR CONTROLLING AND MANAGING THE BIOMASS STORE OF BIOLOGICAL INSTALLATIONS TREATING WASTE WATER

(75) Inventors: Patrice Chatellier, Paris; Philippe Caulet, Bailly, both of (FR)

(73) Assignee: Suez-Lyonnaise Des Eaux, Nanterre Cedex (FR)

( * ) Notice: Subject to any disclaimer, the term of this patent is extended or adjusted under 35 U.S.C. 154(b) by 0 days.

(21) Appl. No.: 09/509,801

(22) PCT Filed: Sep. 23, 1998

(86) PCT No.: PCT/FR98/02047

§ 371 Date: Jun. 15, 2000

§ 102(e) Date: Jun. 15, 2000

(87) PCT Pub. No.: WO99/18034

PCT Pub. Date: Apr. 15, 1999

(30) Foreign Application Priority Data

Oct. 2, 1997 (FR) .................................................. 97 12281

(51) Int. Cl.⁷ .................................. C02F 3/00; C02F 3/12
(52) U.S. Cl. ............................................ 210/614; 210/623
(58) Field of Search ................................... 210/614, 620, 210/621, 623, 629

(56) References Cited

U.S. PATENT DOCUMENTS

| | | | |
|---|---|---|---|
| 3,281,594 | * | 10/1966 | Garrison . |
| 3,558,255 | * | 1/1971 | Rose . |
| 4,130,481 | * | 12/1978 | Chase et al. . |
| 6,007,721 | * | 12/1999 | Payraudeau et al. . |

FOREIGN PATENT DOCUMENTS 04 277086 * 10/1992 (JP) .

* cited by examiner

*Primary Examiner*—Chester T. Barry
*Assistant Examiner*—Fred Prince
(74) *Attorney, Agent, or Firm*—Connolly Bove Lodge & Hutz

(57) ABSTRACT

A method of monitoring and managing biomass stock of treatment plants employs activated sludge. An aeration basin receives an effluent and a concentration of suspended matter in the basin is measured. A change in concentration is then analyzed and a maxima of this concentration is determined which corresponds to periods of hydraulic underperformance. A total biomass mass is estimated, and the rate of extraction of biomass is adjusted.

5 Claims, 1 Drawing Sheet

METHOD FOR CONTROLLING AND MANAGING THE BIOMASS STORE OF BIOLOGICAL INSTALLATIONS TREATING WASTE WATER

FIELD OF THE INVENTION

The invention relates to a method of monitoring and of managing the amount of biomass contained in a station for the biological treatment of municipal or industrial wastewater by activated sludge.

BACKGROUND OF THE INVENTION

In other words, the objective of the invention is to provide a method that can be used to establish an "inventory of the biomass" contained in such a station, this information making it possible, when it is coupled with the amount of biomass extracted from the plant, to quantify the flow of pollution (concentration×flow rate) received by the treatment station. It is then possible to keep the said amount of biomass at an optimum level corresponding to the best possible state of operation of the purification station.

As a consequence of the European directives, the purification techniques currently employed aim to limit discharges, into the natural environment, of untreated wastewater, the stations having to treat all collected water apart from exceptional downpours. The treatment stations have the common characteristics of carrying out a purification by activated sludge, comprising a treatment basin (for example an aeration basin coupled to a clarifier), of being sized on the basis of low COD-BOD loads and of ensuring more of less complete elimination of the nitrogenous pollution.

Furthermore, increased reliability of the stations is required by the European directives and this means that the purification stations have to be strictly monitored and maintained in the best possible state of operation, with a maximum available purifying capacity. In addition, discharge into the natural environment of an effluent of constant quality is an additional constraint, most particularly in cases (which are frequent) in which the pollution load and the flow rate of wastewater to be treated vary very significantly.

It is known that the treatment basin of a purification station contains a homogenous "water/biomass" mixture called mixed liquor. The biomass concentration in the clarifier varies in space and over time. This is due to the settling phenomenon which takes place in the clarifier. It follows that it is impossible to estimate the amount of biomass contained in the clarifier and consequently to estimate the total amount of biomass contained in the plant. Thus, at the present time, no known device for operating and for running plants for water treatment takes into account the management of this "reservoir" of available biomass, although all the conventional actions for controlling the stations are manifested by conservation of the biomass, at least in the case in which the said control results in a stable and balanced operation of the said stations.

The only "evaluation" obtainable by the operator consists in taking a measurement of the concentration of activated sludge, in comparing the result of this measurement with the design-guide value provided by the supplier of the plant and then in adjusting, by successive approximations, the manual extraction of the sludge so as to approach as close as possible this set value. It may therefore be stated that the prior art in this field of the invention with regard to sludge is particularly rudimentary.

However, the problem of monitoring the mass of sludge during clarification is particularly important. Too great a mass of sludge in a clarifier firstly results in anoxic conditions, with an immediate effect of potential denitrification and therefore the appearance of froth on the surface of the said clarifier.

Secondly, the sludge enters under anaerobic conditions, the repercussions of which are often disastrous on the water system and on the treatment of the sludge. This is because, with regard to the water treatment, the development of filamentary microorganisms is favoured, which causes, over the entire station, problems of foaming and of poor floc settling (an increase in the Mohlman index). The risk of sludge entrainment in the clarified water is then increased in the event of a hydraulic surge. The anaerobic conditions are, in addition, completely incompatible with the process of biological dephosphatization and, in this case, the release of phosphorus in the clarifier means that the discharges are immediately off-specification. These events are thus characteristic of a major malfunction with regard to the water system. In parallel, and from a direct economic standpoint, the sludge treatment is not optimized when the floc-settling properties are poor, this being so whatever the treatment system encountered. The times required for operating the equipment of the sludge-treatment system are extended, the solids contents are reduced and, directly, the volumes of sludge extracted are increased for the same mass of dry matter treated.

One characteristic common to biological purification stations (see the figure) is the maintenance of dynamic equilibrium of the system by means of a permanent recirculation of the purifying biomass which is successively transferred from the aeration basin into the clarifier, thereafter to be recirculated from the clarifier into the aeration basin. This recirculation is accomplished using a pump whose capacity determines:

the amount of biomass that can be recirculated; and indirectly, the mass of biomass which can be maintained in the plant without there being a risk of overaccumulation in the clarifier.

Under equilibrium conditions of the purification treatment, a total mass of biomass present in a given plant allows a maximum permissible flow rate to the plant, above which flow rate a phenomenon of biomass overaccumulation in the clarifier occurs.

This phenomenon has the consequence of keeping the biomass in an unaerated medium for a prolonged period of time. This results in degradation of the biomass due to the lack of oxygen to which it is exposed.

Apart from the damage done to the biomass, an overaccumulation of biological sludge may result in a discharge of biomass mixed with the treated water and therefore in the discharges into the natural environment being off-specification with regard to the content of suspended matter.

The tailoring of the mass of sludge in a plant according to the maximum flow likely to arrive at any instant is therefore essential to the conservation of the natural environment. This tailoring requires a monitoring system capable of evaluating, at a sufficiently high frequency, the total mass of biomass contained in the plant. This is one of the objectives of the present invention.

Moreover, experience shows that the mass load (defined as the flow of pollution to be treated with respect to the amount of biomass present in the plant) is a key parameter for the quality of the water treated. Too high a mass load may result in poor quality of the water treated.

However, since the operator of a purification station has no means of monitoring the flow of pollution to be treated, he has to be able to modify the mass load on his plant and the only adaptable parameter is the variation in the amount of biomass present in the said plant. Knowing the total mass of biomass present in the plant is therefore a key item of information in the running of the biological purification process.

To meet the new European standards on sensitive environments means having to design plants which never exceed their rated load. This constraint has the consequence of frequently operating the plant at hydraulic loads substantially below the rated load. This is especially the case at night. During these periods, the flow entering the plant is small, whereas the flow recirculated from the clarifier into the aeration basin, even if it decreases, must remain at least equal to a value imposed by the recirculating pumps and the hydraulics of the clarifier. This results in transfer of sludge mass from the clarifier into the aeration basin, the mass of the biomass contained in the clarifier becoming negligible compared with the mass contained in the aeration basin.

Analysing the change in the biomass concentration in the aeration basin makes it possible to visualize this phenomenon. This is because this parameter periodically passes through relative maxima corresponding to periods of hydraulic under-performance. The value of the concentration obtained during these maxima gives, by multiplying it by the volume of the aeration basin, an estimate of the total mass of biomass contained in the purification station.

U.S. Pat. No. 3,558,255 relates to a system for monitoring an effluent-treatment plant, which includes measuring the concentration of suspended matter. According to that system, the sludge concentrations in a biological reactor combined with a clarifier are balanced by measuring the concentration of suspended matter in the aeration basin and then by transferring, by means of recirculation, the amounts of sludge which are deemed necessary, especially when faced with a pollution peak.

JP-A-04,277,086 relates to a method of automatically monitoring the recycled sludge in an activated-sludge treatment plant. The sludge is recycled into two types of biological basins, one operating with aerobic bacteria and the other with optionally anaerobic bacteria. The amount of sludge recirculated is adjusted on the basis of a measurement of the concentration of suspended matter in the aeration basins.

Neither of these publications mentioned above is able to adjust the rate of purging of the biological sludge. In both these publications, the problem solved is that of recirculating the sludge whereas, in the present application, the problem to be solved is that of managing the amount of biomass contained in the treatment plant.

BRIEF DESCRIPTION OF THE INVENTION

The present invention relates to a method of monitoring the stock of biomass, making it possible to manage the amount of biomass contained in the treatment plant, this method being characterized by the use of the variations in the hydraulic conditions imposed by the variations in the flow rate of water to be treated in order to evaluate the total amount of sludge present in the biological treatment plant, this evaluation, made by measuring the amount of suspended matter in the aeration basin of the plant, being carried out during periods of hydraulic underperformance which correspond to the maxima of the concentrations of biomass in the said basin, the value of the said concentration giving, once it has been multiplied by the volume of the said basin, an estimate of the total mass of biomass contained in the purification plant.

BRIEF DESCRIPTION OF THE DRAWING

The single FIGURE of the appended drawing shows schematically the plant in which the method of the invention is employed.

DETAILED DESCRIPTION OF THE INVENTION

Figure 1:
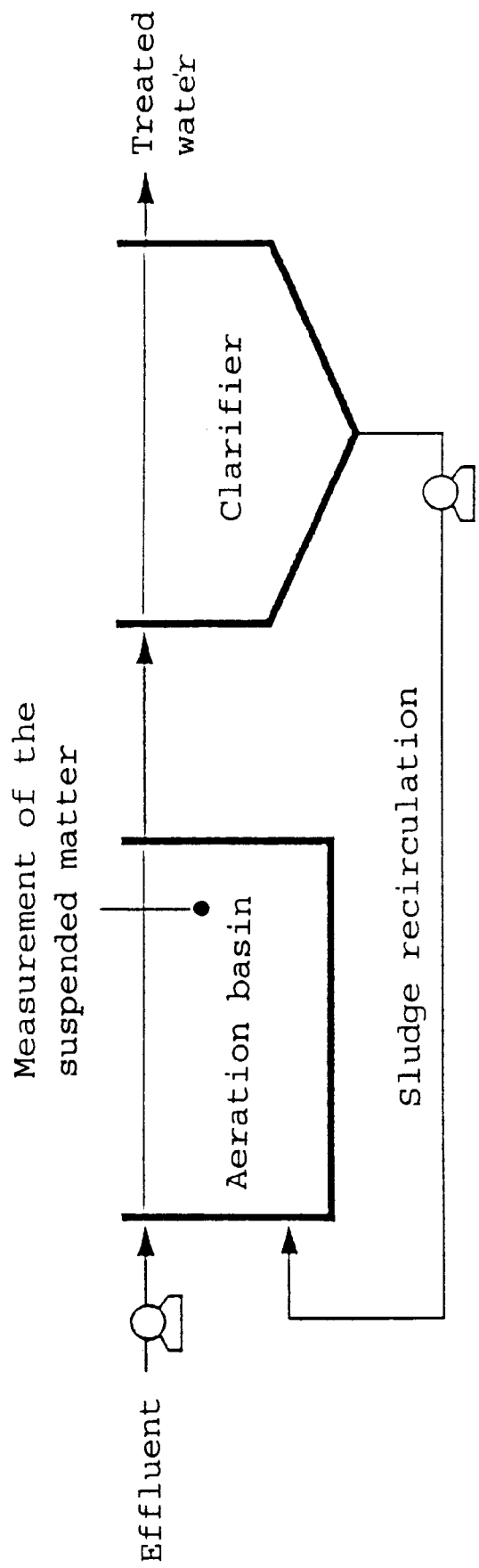

The conservation-of-material principle means that the change in the mass of biomass contained in the plant is equal to the amount of general biomass in the said plant less the amount of biomass extracted by the operator and less the amount of biomass accidentally discharged into the natural environment. Provided that no accidental discharge is observed (for example by measuring the turbidity of the treated effluent) and provided that the operator knows the amount of biomass that he has extracted (by measuring the concentration and extraction flow rates), it is possible to deduce from the change in the stock of biomass the amount of biomass produced by the system. It is then possible to estimate, from this parameter, the amount of pollution received by the plant.

As specified above, the method forming the subject of the invention makes it possible to estimate the total mass of biomass contained in the purification station and the amount of pollution received by the latter. Based on this value, the method also makes it possible to choose the rate of extraction of the biomass so as to adjust the total mass of biomass according to the amount of pollution received, the ratio of these two parameters having to be kept constant in order to obtain a stable treatment quality. Moreover, the rate of extraction of biomass must be managed in such a way that the stock of biomass does not exceed a maximum value above which the risk of accidental discharge of biomass mixed with the treated effluent becomes too high.

By suitably choosing the rate of extraction of the biomass, it is possible to obtain a treatment quality which is stable and which limits the risk of biomass being accidentally discharged into the natural environment.

It will be noted that the monitoring technique employed by the method of the invention requires only a probe, shown in the figure, for measuring the suspended matter in order to calculate the total amount of biomass present in the treatment plant. It follows that this essential item of information can be obtained inexpensively and with a sufficient periodicity for good management of the plant.

Of course, it remains to be stated that the present invention is not limited to the embodiments described and/or illustrated, rather it encompasses all the variants thereof which fall within the scope of the appended claims.

What is claimed is:

1. Method of monitoring and of managing stock of biomass of a plant for a biological treatment of municipal or industrial wastewater by activated sludge, which include an aeration basin receiving an effluent to be treated and a clarification basin, the method comprising steps, wherein:
   a concentration of suspended matter in the aeration basin is measured;
   a change in the concentration is analyzed;
   a maxima of this concentration which corresponds to periods of hydraulic underperformance is determined;
   a total mass of biomass contained in the treatment plant is estimated by multiplying the maxima by the volume of the aeration basin; and
   the rate of extraction of the biomass from the plant is varied so as to adjust the total mass of the biomass contained in the plant according to pollution to be treated by the plant.

2. Method according to claim 1, wherein an amount of biomass produced by the plant, giving an estimate of an amount of pollution received by the plant, is determined on a basis of the change in the total mass of biomass contained in the plant, the latter amount being equal to an amount of biomass generated in the plant less an amount of biomass extracted by an operator.

3. Method according to claim 1, wherein a ratio of the total mass of the biomass contained in the plant to a rate of extraction of the biomass from the plant is kept constant.

4. Method according to claim 1, wherein a rate of extraction of the biomass is managed so that the stock of biomass does not exceed a pre-selected maximum value.

5. Method according to claim 3, wherein a rate of extraction of the biomass is managed so that the stock of biomass does not exceed a pre-selected maximum value.

* * * * *